United States Patent [19]

Oguni et al.

[11] Patent Number: 4,706,469
[45] Date of Patent: Nov. 17, 1987

[54] REFRIGERANT FLOW CONTROL SYSTEM FOR USE WITH REFRIGERATOR

[75] Inventors: Kensaku Oguni; Kyuhei Ishibane; Shigeaki Kuroda, all of Shimizu; Hiromu Yasuda, Shizuoka; Takashi Sano; Hironori Etou, both of Shimizu, all of Japan

[73] Assignee: Hitachi, Ltd., Tokyo, Japan

[21] Appl. No.: 16,404

[22] Filed: Feb. 19, 1987

[30] Foreign Application Priority Data

Mar. 14, 1986 [JP] Japan .................................. 61-54809
May 21, 1986 [JP] Japan ................................ 61-114602

[51] Int. Cl.⁴ ............................................. F25B 41/04
[52] U.S. Cl. ......................................... 62/222; 62/210
[58] Field of Search ................. 62/222, 223, 224, 225, 62/210, 211, 212, 204, 205, 206, 505; 236/75, 92 B

[56] References Cited

U.S. PATENT DOCUMENTS 2,524,913 10/1950 Lathrop ............................ 62/210 X
4,261,180 4/1981 Nozawa et al. ................... 62/222 X
4,362,027 12/1982 Barbier .................................. 62/197
4,517,811 5/1985 Atsumi et al. ..................... 62/205 X
4,620,424 11/1986 Tanaka et al. ......................... 62/222

Primary Examiner—Harry B. Tanner
Attorney, Agent, or Firm—Antonelli, Terry & Wands

[57] ABSTRACT

A refrigerant flow control system associated with a refrigerant circulating circuit having a compressor, a condenser, an expansion valve and an evaporator, includes a branch pipe extending from a discharge pipe of the compressor and having on sealed free end. A first temperature sensor is disposed on the branch pipe near the sealed free end for detecting a condensation temperature of a refrigerant which is condensed in the branch pipe. A second temperature sensor is disposed on the discharge pipe of the compressor for detecting a temperature of the gaseous refrigerant discharged from the compressor. The signals representative of the condensation temperature and the temperature of the discharge gaseous refrigerant are inputted to a control device. The control device calculates a difference between the two detected temperatures, and a degree of superheat of the discharged gaseous refrigerant and transfers to the expansion valve a command signal representative of the calculation results, thereby controlling an opening of the expansion valve.

12 Claims, 8 Drawing Figures

DEGREE OF SUPERHEAT OF
DISCHARGED REFRIGERANT

REFRIGERANT FLOW CONTROL SYSTEM FOR USE WITH REFRIGERATOR

FIELD OF THE INVENTION AND RELATED ART STATEMENT

The present invention relates generally to a refrigerant flow control system for use with an air conditioner provided with a refrigerant circulating circuit including main constituent components such as a compressor, a condenser, an expansion valve and an evaporator, and in particular to a refrigerant flow control system arranged to control an opening degree of the expansion valve operated by an electrical signal in accordance with a degree of superheat of the refrigerant in a high-pressure side of the refrigerant circulating circuit.

U.S. Pat. No. 4,362,027 discloses such control system in which an opening degree of an expansion valve provided in a refrigerant circulating circuit is regulated to control a refrigerant flow. In accordance with this control system, the refrigerant circulating circuit includes a bypass line extending from an outlet pipe of a condenser to a suction pipe via a pressure reducing unit, a first temperature sensor disposed on an outlet pipe of the pressure reducing unit, and a second temperature sensor disposed on an outlet pipe of an evaporator. The sensors detect temperatures of evaporation of a liquid refrigerant and of the refrigerant in the outlet of the evaporator, respectively. The opening degree of the expansion valve is so regulated that a difference between these temperatures may be maintained at a constant level, thereby controlling the refrigerant flow in the refrigerant circulating circuit. This system is based on a method of controlling the degree of superheat of the refrigerant in the outlet of the evaporator. The U.S. Pat. No. 4,362,027 sets forth several methods of detecting evaporation temperatures, such as a method in which the first temperature sensor is disposed at an intermediate portion of the bypass line branched from an intermediate portion of a pipe extending from the expansion valve to the evaporator and connected to a suction pipe, or another method in which the first temperature sensor is disposed in an inlet pipe of the evaporator.

In the case of a heat pump type air conditioner, an outdoor heat exchanger serves as an evaporator during a heating operation, while, during a cooling operation, an indoor heat exchanger serves as an evaporator. Therefore, in case that the temperature sensor is disposed in the inlet of tne evaporator to detect an evaporation temperature, it is required to provide two temperature sensors for detecting the evaporation temperatures. More specifically, in this case, in addition to such two temperature sensors, another temperature sensor is required for detecting the temperature of the refrigerant in the outlet of the evaporator. However, in the previously-described method in which the temperature sensor is disposed on the outlet pipe of the pressure reducing unit in the bypass line extending from the outlet pipe of the condenser to the suction pipe so as to detect the evaporation temperature, the bypass line is to be branched off on the outlet side of the indoor heat exchanger during the heating operation, while during the cooling operation the bypass line is to be branched off on the outlet side of the outdoor heat exchanger. Accordingly, this method requires the arrangement in which both of the branched bypass lines can be switched over therebetween by means of a flow-channel changeover valve, but this involves problems in that the structure of the system becomes complex.

In addition to the above-mentioned constitutional problems, the following problems are pointed out. More specifically, the aforesaid method in which the degree of superheat in the outlet of the evaporator is controlled by the expansion valve occasionally suffers from the problem that, when a ratio of the discharge pressure of the compressor and the suction pressure thereof, namely, a pressure ratio is high, the temperature of the gaseous refrigerant discharged from the compressor may abnormally rise. For example, when a heat pump type air conditioner is operated for heating purposes at a low outdoor air temperature, the suction pressure of the compressor becomes low and thus the pressure ratio becomes high.

In the case of a compressor of the type including an electrical motor, the abnormal rise of the temperature of the gaseous refrigerant discharged entails an abnormal increase in the temperature of the winding in the electrical motor. An excessive increase in the temperature may cause a burning of the motor. Under the conditions that the temperature of the winding in the motor shows an abnormal rise in this manner, it becomes necessary to provide means for introducing a liquid refrigerant into the suction side of the compressor.

OBJECT AND SUMMARY OF THE INVENTION

It is therefore an object of the present invention to provide a refrigerant flow control system arranged to accurately detect at the vicinity of a compressor a degree of superheat of the refrigerant discharged from the compressor, to adjust an opening degree of an expansion valve in accordance with the detected degree of superheat of the discharged refrigerant, and to control a flow rate of the refrigerant so as to consistently maintain a proper degree of superheat, thereby improving the performance of a refrigerant circulating circuit and ensuring the reliability of the compressor.

To this end, detection is made with respect to a saturation temperature equivalent to the pressure of the atmosphere of the gaseous refrigerant discharged from the compressor and the temperature of the discharged gaseous refrigerant, and the opening degree of the expansion valve is controlled on the basis of the temperature difference between such detected temperatures.

The arrangement of the present invention is such featured that a branch pipe having one sealed free end is branched off from an intermediate portion of a pipe which allows the passage of the refrigerant discharged from the compressor, a first temperature sensor is disposed on the branch pipe near the sealed free end for detecting the condensation temperature of the refrigerant which is condensed in the branch pipe, a second temperature sensor is disposed for detecting the temperature of the gaseous refrigerant discharged from the compressor, signals representative of the condensation temperature and the temperature of the discharged gaseous refrigerant which have respectively been detected by the aforesaid first and second temperature sensors are inputted to a control device, and the control device calculates the difference between the detected temperatures, i.e., the degree of superheat of the discharged gaseous refrigerant and outputs to the expansion valve a command signal representative of the calculation results, thereby controlling the opening degree of the expansion valve.

As described above, in accordance with the present invention, two sensors incorporated are used to detect, in the vicinity of the compressor, a saturation temperature corresponding to the pressure of the atmosphere of the gaseous refrigerant discharged from the compressor 5 and the temperature of the discharged gaseous refrigerant, thereby enabling the accurate detection of the degree of superheat of the refrigerant discharged from the compressor. Thus, the opening degree of the expansion valve can be adjusted in accordance with the detected degree of superheat, so that the flow rate of the refrigerant can be properly controlled and the performance of the refrigerant circulation circuit can be utilized to the maximum extent.

In addition, on the suction side of the compressor, the refrigerant may be superheated or a liquid refrigerant may be introduced into the gaseous refrigerant. For example, under the conditions that the temperature of the winding in the compressor motor abnormally rises, the liquid refrigerant can be introduced into the gaseous refrigerant on the suction side to prevent the burning of the motor, resulting in an improvement in the reliability of the system.

Further objects, features and advantages of the present invention will become apparent from the following description of preferred embodiments of the present invention with reference to the accompanying drawings.

DESCRIPTION OF THE PREFERRED EMBODIMENTS

Figure 1:
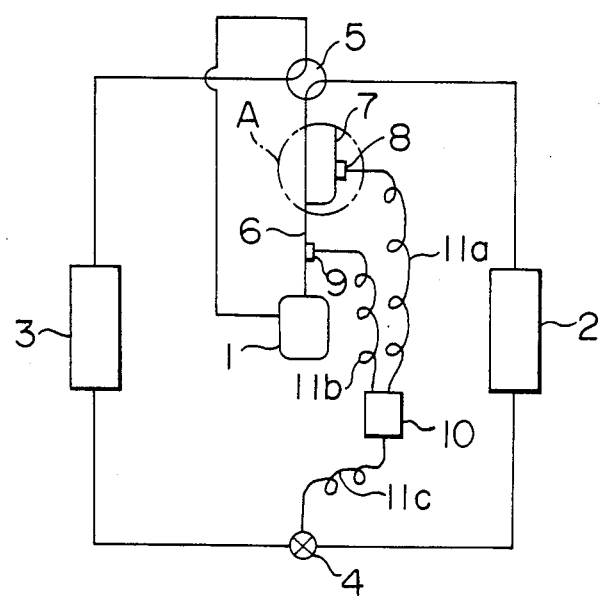
FIG. 1 is a circuit diagram of a first preferred embodiment of the present invention showing a refrigerant circulating circuit for use with a heat pump type air conditioner.
Figure 2:
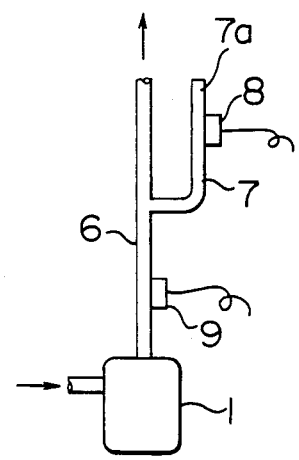
FIG. 2 is a schematic, enlarged view of a branch pipe portion indicated generally by A in FIG. 1.

A refrigerant circulating circuit for use with a heat pump type air conditioner shown in FIG. 1 includes a compressor 1, an indoor heat exchanger 2, an outdoor heat exchanger 3, an expansion valve 4 and a four-way valve 5. Such members are connected to each other to form a closed refrigerant circulating circuit in an illustrated manner. The direction of flow of the refrigerant in the circuit is reversed by switching over the four-way valve 5. A discharge pipe 6 extends from a discharge outlet of the compressor 1 to the four-way valve 5, and a branch pipe 7 is connected to the pipe 6. As shown in FIG. 2, the branch pipe 7 extends upwards in a hook-like manner and a free end 7a thereof is sealed. Also, the branch pipe 7 is so disposed as to be exposed to the outside air directly or through cooling fins attached thereto. Near the free end 7a of the branch pipe 7 is attached a first temperature sensor 8 for detecting a condensation temperature of the refrigerant which is condensed in the branch pipe 7. On the discharge pipe 6 is attached a second temperature sensor 9 for detecting a temperature of the gaseous refrigerant discharged from the compressor 1. The first and the second temperature sensors 8 and 9 are connected to a control device 10 through electrical wires 11a and 11b, respectively. The control device 10 calculates a difference between the condensation temperature and the temperature of the discharged gaseous refrigerant which are respectively detected by the first and the second temperature sensors 8 and 9. The control device 10 outputs a command signal based on the detection results to the expansion valve 4 through an electrical wire 11c, and controls an opening degree of the expansion valve 4.

The operation of the first preferred embodiment will be described below.

During the heating operation, a high-temperature and high-pressure refrigerant is discharged from the compressor 1 through the four-way valve 5 into the indoor heat exchanger 2 in which the refrigerant is cooled and condensed into a condensation. In the expansion valve 4, the liquid refrigerant is subjected to a pressure reducing step, and then flows into the outdoor heat exchanger 3 in which the refrigerant is evaporated by absorbing heat from the outside. Subsequently, the gaseous refrigerant flows through the four-way valve 5 and is sucked into the compressor 1.

During the aforesaid heating operation, a part of the gaseous refrigerant flows from the pipe 6 into the branch pipe 7 in which the refrigerant is cooled by outside air and condensed into a condensation. The liquid refrigerant flows black, downwardly along an inner wall of the branch pipe 7, to an interior of the pipe 6, and circulates in the refrigerant circuit. The liquid refrigerant flows from the branch pipe 7 into the pipe 6, at the same time, gaseous refrigerant flows from the pipe 6 into the branch pipe 7. In the meantime, the first temperature sensor 8 detects the condensation temperature of the liquid refrigerant in the branch pipe 7 while the second temperature sensor 9 detects the temperature of the gaseous refrigerant discharged from the compressor 1. The signals representative of such detected temperatures are inputted to the control device 10. The control device 10 calculates a difference between the condensation temperature and the temperature of the discharged gaseous refrigerant, and a degree of superheat of the discharged gaseous refrigerant. The control device 10 delivers to the expansion valve 4 a command signal based on the results of the calculation and controls the opening of the expansion valve 4. Thus, the flow rate of the refrigerant is controlled in such a manner that the aforesaid degree of superheat is consistently maintained at a predetermined level.

On the contrary, for a cooling operation, the four-way valve 5 is switched over. The refrigerant discharged from the compressor 1 is circulated in the order of the compressor 1, the four-way valve 5, the outdoor heat exchanger 3, the expansion valve 4, the indoor heat exchanger 2, and the compressor 1. Specifically, the cooling operation is reverse to the heating operation. The function of the indoor heat exchanger 2 is changed from an evaporator to a condenser while that of the outdoor heat exchanger 3 is changed form a condenser to an evaporator. Also, during the cooling operation, the first temperature sensor 8 detects the condensation temperature of the refrigerant in the branch pipe 7 while the second temperature sensor 9 detects the temperature of the discharged gaseous refrigerant, so that the opening degree of the expansion valve 4 is adjusted to thereby control the flow rate of the refrigerant.

Accordingly, in accordance with the first preferred embodiment, during the cooling operation as well as the hating operation, the flow rate of the refrigerant can be controlled by means of the two sensors; the first temperature sensor 8 for detecting the condensation temperature in the branch pipe 7 and the second temperature sensor 9 for detecting the temperature of the gaseous refrigerant discharged from the compressor 1. Also, in the branch pipe 7 as a condensation temperature detecting portion, is repeated the process that the condensed liquid refrigerant flows back downwardly from the pipe 7 into the refrigerant circuit and, at the same time, the gaseous refrigerant flows into the pipe 7. This enables the first temperature sensor 9 to perform a stable detection of condensation temperature. In consequence, it is possible to consistently provide the accurate control of the flow rate of the refrigerant.

Figure 3:
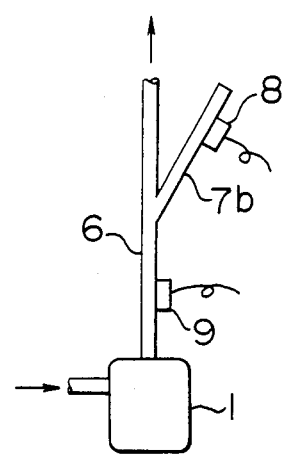
FIG. 3 is a schematic, enlarged view showing a modified form of the branch pipe portion.

FIG. 3 shows another modified form of the extension of a branch pipe. As shown, a branch pipe 7b may extend from the pipe 6 upwardly in an inclined manner. The extension form of the branch pipe can be suitably determined in accordance with the layout of the respective circuit components.

Figure 4:
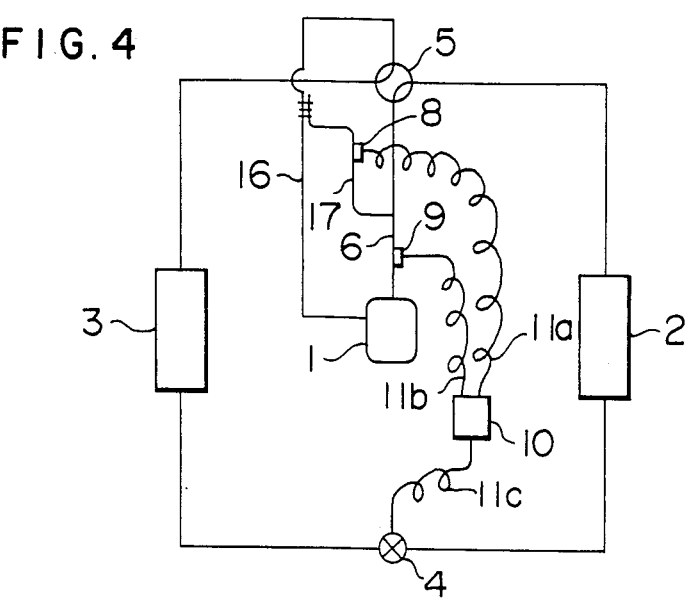
FIG. 4 is a circuit diagram of a second embodiment showing another refrigeration circulating circuit for use with the heat pump type air conditioner.

FIG. 4 shows the second preferred embodiment of the invention in which it is possible to positively detect a saturation temperature corresponding to the pressure of the atmosphere of the discharged gaseous refrigerant by actively cooling the branch pipe. As shown, in the same manner as in the embodiment illustrated in FIG. 1, the refrigerant circulating circuit for a heat pump type air conditioner includes a compressor 1, an indoor heat exchanger 2, an outdoor heat exchanger 3, an expansion valve 4 and a four-way valve 5. These elements are connected to each other to form a closed refrigerant circulating circuit. The direction of flow of the refrigerant in the refrigerant circulating circuit is reversed by switching the four-way valve 5. A branch pipe 17 extends from a pipe 6 extending from a discharge port of the compressor 1 to the four-way valve 5. The first temperature sensor 8 is attached on the branch pipe 17. The second temperature sensor 9 is attached on the pipe 6. These temperature sensors 8 and 9 are connected to a control device 10 by electrical wires 11a and 11b, respectively. The above-mentioned arrangement is similar to that shown in FIG. 1, and the aforesaid refrigerant circulating circuit is capable of providing the same cooling/heating operations as those of the first embodiment shown in FIG. 1. The second embodiment which will be described later differs from the first embodiment in FIG. 1 in that the branch pipe 17 is heat-exchangably attached at a sealed end portion thereof to a suction pipe 16 extending from the four-way valve 5 to the suction port of the compressor 1.

Figure 5:
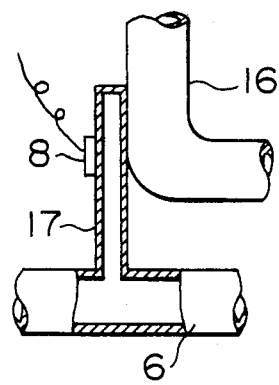
FIG. 5 is an enlarged, detailed view of a branch pipe portion shown in FIG. 4.

Referring to FIG. 5 showing the details of the branch pipe 17, the branch pipe 17 extends upwards from the pipe 6 in a direction perpendicular to a longitudinal axis hereof. The gaseous refrigerant in the branch pipe 17 is cooled by the suction pipe 16 down to a low temperature at which the refrigerant starts to be condensed at a certain location of the branch pipe 17. Thus, the temperature in the branch pipe 17 becomes substantially uniform along the length thereof. The liquid refrigerant flows downwardly from the distal sealed end portion of the branch pipe 17, and is evaporated by virtue of the gaseous refrigerant discharged from the compressor 1 to obtain a circulation of refrigerant in the branch pipe 17. Thus, a temperature is maintained constant in the branch pipe 17 in which the liquid refrigerant is present. The first sensor 8 is attached to a portion of the branch pipe 17 in which the temperature is maintained constant, so that it is possible to positively detect a saturation temperature Tsat corresponding to the pressure of the atmosphere of the discharged gaseous refrigerant.

In the meantime, the second temperature sensor 9 detects the temperature Td of the discharged gaseous refrigerant. The control device 10 controls an opening degree of the expansion valve 4 in accordance with the resultant temperature difference (Td−Tsat), i.e., the degree of superheat SHd of the discharged gaseous refrigerant.

The predetermined value of the degree of superheat of the discharged gaseous refrigerant will be described below.

Figure 6:
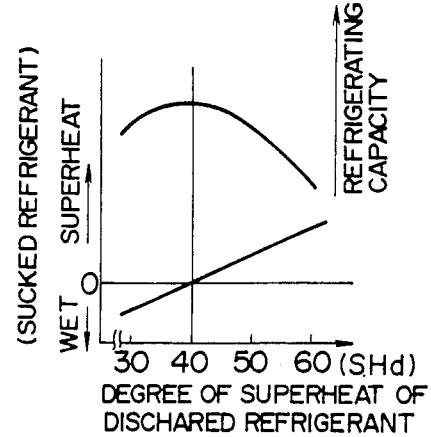
FIG. 6 is a graph of the characteristics of the refrigerant circulating circuit in accordance with the present invention.

FIG. 6 is a graph of the relationships between the degree of superheat SHd of the discharged refrigerant, and the degree of superheat or wetness on the suction side of the comressor 1. As will be evident from FIG. 6, as the degree of superheat SHd becomes lower, the refrigerant on the suction side of the compressor 1 becomes a wet condition in which the liquid refrigerant is continued, whereas as the degree of superheat SHd becomes higher, the refrigerant on the suction side of the compressor 1 becomes a superheated condition. The refrigerating capacity of the system is maximized when the degree of superheat of the refrigerant on the suction side of the compressor 1 is near 0. Therefore, according to the example shown in FIG. 6, when the predetermined value of the degree of superheat SHd of the discharged gaseous refrigerant is 40, the maximum capacity of the refrigeration can be obtained.

Also, under the conditions that the temperature of the discharged gaseous refrigerant abnormally rises or the winding in a motor incorporated in the compressor 1 shows the abnormal rise of temperature due to a high pressure ratio of the compressor 1, if the predetermined value of the degree of superheat SHd is made small, a liquid refrigerant can be introduced into the gaseous refrigerant on the suction side of the compressor 1, and then the motor can be cooled.

As described above, according to the second embodiment, it is possible to positively detect the degree of superheat SHd of the discharged gaseous refrigerant in the vicinity of the compressor 1. Thus, the performance of the refrigeration cycle can be utilized to the maximum extent by suitably selecting a predetermined value of the degree of superheat SHd. In addition, if the predetermined value of the degree of superheat of the discharged gaseous refrigerant is modified in accordance with the rotational speed of the compressor 1 and the temperatures of the refrigerant in the condenser and the evaporator, and then the refrigeration capacity can be controlled to the maximum extent even when the operating condition of the refrigeration circuit is varied.

Figure 7:
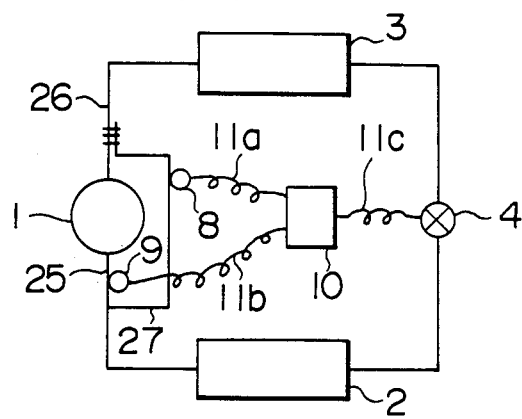
FIG. 7 is a circuit diagram of a nonreversible refrigerant circulating circuit showing a third embodiment of the present invention.

FIG. 7 shows a third preferred embodiment of the present invention. Although FIGS. 1 and 4 respectively show the embodiments intended for heat pump type refrigerant circulating circuitry, the third embodiment is not confined solely to the heat pump type refrigeration circulating circuit. As shown in FIG. 7, it is applicable to a non-reversible refrigerant circulating circuit as well. According to the third embodiment, the refrigerant circulating circuit includes a compressor 1, a condenser 2, an evaporator 3 and an expansion valve 4 which is electrically driven. These members are connected to each other to form a closed refrigerant circulating circuit. A gaseous refrigerant discharge pipe 25 extends from the compressor 1 to the condenser 2, and a branch pipe 27 has one sealed end and the other end which is opened into the discharge pipe 25. A first temperature sensor 8 is attached to the branch pipe 27 so as to detect a temperature thereof, and a second temperature sensor 9 is attached to the discharge pipe 25 near the compressor 1 so as to detect a temperature of the gaseous refrigerant discharged from the compressor 1. A control device 10 receives signals from the sensors 8 and 9, which are representative of a saturation temperature Tsat detected by the first sensor 8 and a temperature Td of the discharged refrigerant detected by the second sensor 9, respectively and calculates a degree of superheat SHd (=Td−Tsat). The control device 10 controls an opening degree of the expansion valve 4 on the basis of the calculated degree of superheat SHd. The sealed end of the branch pipe 27 is heat-exchangably attached to a suction pipe 26.

The operations of the first and second temperature sensors 8, 9 and the control device 10 are similar to those described previously in connection with the second embodiment shown in FIG. 4. Therefore, the description thereof is omitted.

Figure 8:
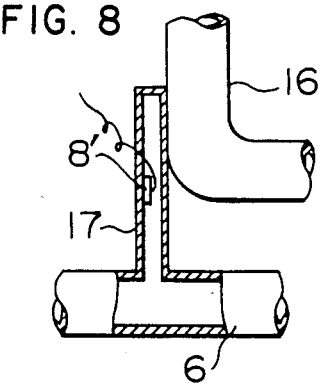
FIG. 8 is an enlarged, detailed view of another branch pipe portion.

Although the aforesaid preferred embodiments each has the first temperature sensor 8 attached to the outer surface of the branch pipe, if the first sensor 8' can be inserted into an interior of each of the branch pipes 7, 17 and 27, it is possible to detect the saturation temperature with further high accuracy (see FIG. 8).

What is claimed is:

1. A refrigerant flow control system for a heat pump type air conditioner incorporating a refrigerant circulating circuit having a compressor, an indoor heat exchanger, an expansion valve, an outdoor heat exchanger and a four-way valve, said system comprising:
   a branch pipe extending from an intermediate portion of a refrigerant pipe connecting a discharge port of said compressor to said four-way valve, and having one sealed free end;
   a first temperature sensor disposed on said branch pipe in the vicinity of said sealed free end thereof for detecting a saturated condensation temperature of said refrigerant which is condensed in said branch pipe;
   a second temperature sensor disposed on a discharge pipe of said compressor for detecting a discharge temperature of the gaseous refrigerant discharged from said compressor; and
   a control device for receiving signals from said first and second temperature sensors, which are representative of the temperatures detected by said sensors, said control device calculating a difference between said saturated condensation temperature and said discharge temperature of said gaseous refrigerant, and a degree of superheat of said gaseous refrigerant discharged, comparing a predetermined degree of superheat with said calculated degree of superheat, delivering to said expansion valve a command signal corresponding to the difference therebetween, and controlling an opening degree of said expansion valve, whereby, if said calculated degree of superheat is higher than said predetermined degree of superheat, said opening degree of said expansion valve is controlled to be increased, while if said calculated degree of superheat is lower than said predetermined degree of superheat, said opening degree of said expansion valve is controlled to be decreased, so that a predetermined degree of superheat is consistently maintained.

2. A refrigerant flow control system according to claim 1, wherein said sealed free end portion of said branch pipe is in contact with an inlet pipe of said compressor.

3. A refrigerant flow control system according to claim 1, wherein said first temperature sensor is disposed within said branch pipe.

4. A refrigerant flow control system according to claim 1, wherein said predetermined degree of superheat is determined in association with a rotational speed of said compressor.

5. A refrigerant flow control system according to claim 1, wherein said predetermined degree of superheat is determined in association with a condensation temperature in said heat exchanger serving as a condenser.

6. A refrigerant flow control system according to claim 1, wherein said predetermined degree of superheat is determined in association with an evaporation temperature in said heat exchanger serving as an evaporator.

7. A refrigerant flow control system for a refrigerator incorporating a refrigerant circulating circuit having a compressor, a condenser, an expansion valve and an evaporator, said system comprising:
   a branch pipe extending from an intermediate portion of a discharge pipe of said compressor, and having one sealed fee end;
   a first temperature sensor disposed on said branch pipe in the vicinity of said sealed free end for detecting a saturated condensation temperature of a gaseous refrigerant discharged from said compressor, which is condensed in said branch pipe;
   a second temperature sensor disposed on a discharge pipe of said compressor for detecting a temperature of said gaseous refrigerant discharged from said compressor; and
   a control device for receiving signals from said first and second temperature sensors, which are representative of the temperatures detected by said sensors, said control device calculating a difference between said saturated condensation temperature and said temperature of said gaseous refrigerant discharged from said compressor, and a degree of superheat of said gaseous refrigerant discharged from said compressor, comparing a predetermined degree of superheat with said calculated degree of superheat, delivering to said expansion valve a command signal corresponding to the difference therebetween, and controlling an opening degree of said expansion valve, whereby, if said calculated degree of superheat is higher than said predetermined degree of superheat, said opening degree of said expansion valve is controlled to be increased, while if said calculated degree of superheat is lower than said predetermined degree of superheat, said opening degree of said expansion valve is controlled to be decreased, so that a predetermined degree of superheat is consistently maintained.

8. A refrigerant flow control system according to claim 7, wherein said sealed free end portion of said branch pipe is in contact with an inlet pipe of said compressor.

9. A refrigerant flow control system according to claim 7, wherein said fist temperature sensor is disposed within said branch pipe.

10. A refrigerant flow control system according to claim 7, wherein said predetermined degree of superheat is determined in association with a rotational speed of said compressor.

11. A refrigerant flow control system according to claim 7, wherein said predetermined degree of superheat is determined in association with a condensation temperature in said condenser.

12. A refrigerant flow control system according to claim 7, wherein said predetermined degree of superheat is determined in association with an evaporation temperature in said evaporator.

* * * * *